US012619348B2

(12) United States Patent
Sun et al.

(10) Patent No.: US 12,619,348 B2
(45) Date of Patent: May 5, 2026

(54) INTERACTION METHOD OF A TERMINAL DEVICE FOR A USER WITH VISUAL IMPAIRMENT

(71) Applicant: HUAWEI TECHNOLOGIES CO., LTD., Shenzhen (CN)

(72) Inventors: Ke Sun, Shenzhen (CN); Jie Xu, Shanghai (CN); Jiayu Long, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/250,975

(22) PCT Filed: Oct. 11, 2021

(86) PCT No.: PCT/CN2021/122977
§ 371 (c)(1),
(2) Date: Apr. 27, 2023

(87) PCT Pub. No.: WO2022/089180
PCT Pub. Date: May 5, 2022

(65) Prior Publication Data
US 2023/0409193 A1 Dec. 21, 2023

(30) Foreign Application Priority Data
Oct. 31, 2020 (CN) .......................... 202011196093.1

(51) Int. Cl.
*G06F 3/04886* (2022.01)
*G06F 3/01* (2006.01)
*G06F 3/16* (2006.01)

(52) U.S. Cl.
CPC .......... *G06F 3/04886* (2013.01); *G06F 3/016* (2013.01); *G06F 3/167* (2013.01)

(58) Field of Classification Search
USPC ........................................................ 715/765
See application file for complete search history.

(56) References Cited

U.S. PATENT DOCUMENTS 6,384,743 B1 * 5/2002 Vanderheiden ..... G06F 3/04886
340/407.1
2005/0049814 A1 * 3/2005 Ramchandani ..... G06F 11/3668
702/123

(Continued)

FOREIGN PATENT DOCUMENTS

| CN | 109062464 A | 12/2018 |
| CN | 109474732 A | 3/2019 |
| CN | 109992177 A | 7/2019 |

OTHER PUBLICATIONS

Bailey, Eric, Large touch targets, The A11Y Project, available at https://www.a11yproject.com/posts/large-touch-targets/ (Nov. 21, 2018).*

*Primary Examiner* — Rayeez R Chowdhury
(74) *Attorney, Agent, or Firm* — WOMBLE BOND DICKINSON (US) LLP

(57) ABSTRACT

An interaction method and a terminal device. The terminal device receives a first location signal through a screen. An interface displayed on the screen includes an operation area and a display area, the operation area includes a first target area, and a page displayed in the display area includes a first target function. The terminal device determines, based on the first location signal, that a location of a touch point is in the first target area, and then the terminal device provides a first feedback used to introduce the first target function.

20 Claims, 7 Drawing Sheets

(56)                References Cited

U.S. PATENT DOCUMENTS

| 2014/0325353 | A1* | 10/2014 | Chudge | ................. | G06F 3/0482 |
| | | | | | 715/716 |
| 2017/0153792 | A1* | 6/2017 | Kapoor | ............... | G06F 3/04883 |
| 2017/0242489 | A1 | 8/2017 | Le Rouzo et al. | | |
| 2017/0336903 | A1* | 11/2017 | Rivaud | ............... | G06F 3/04886 |
| 2018/0024845 | A1* | 1/2018 | Card | ....................... | G06F 3/167 |
| | | | | | 715/719 |
| 2018/0095588 | A1* | 4/2018 | Klein | .................... | H04L 9/3231 |

* cited by examiner

A terminal device determines, based on a first location signal, that a location of a touch point is in a second target area ⟋ 301

The terminal device provides a second feedback, where the second feedback is used to introduce a second target function ⟋ 302

INTERACTION METHOD OF A TERMINAL DEVICE FOR A USER WITH VISUAL IMPAIRMENT

This application is a national stage of International Application No. PCT/CN2021/122977, filed on Oct. 11, 2021, which claims priority to Chinese Patent Application No. 202011196093.1, filed. Both of the aforementioned applications are incorporated herein by reference in their entireties.

TECHNICAL FIELD

Embodiments of this application relate to the communication field, and in particular, to an interaction method and a terminal device.

BACKGROUND

Different from a common user with sound vision, a user with visual impairment cannot see content displayed on a screen, and cannot accurately tap a location on the screen. Therefore, currently, the user with visual impairment mainly relies on a screen reading service to operate a mobile phone.

In a screen reading process, an area that is being read by a terminal device is referred to as a focus. When the user with visual impairment needs to browse content on a page, the focus can traverse all content and functions on the page displayed on the screen. When the focus moves to an interactive object, the device may read a text label of the object. For example, a page of a mobile payment website includes a plurality of functions. When the focus moves to a "payment" button on a page displayed on a screen, if the function is a function desired by the user with visual impairment, a specified operation may be performed at any location on the screen to select the button, so as to implement a function corresponding to the button. If the function is not the one that the user wants, the focus continues to be slid to move to a next button until the user with visual impairment selects a desired function or the focus traverses the entire page.

An existing website page usually has various content, and all functions on the page are traversed to select a function that the user with visual impairment wants to execute. Such an interaction manner has low efficiency.

SUMMARY

Embodiments of this application provide an interaction method and a terminal device. The terminal device determines, based on a first location signal, that a location of a touch point is in a first target area, and then the terminal device provides a first feedback used to introduce a first target function. A user may learn, in this manner, of a function included in a display area, thereby improving efficiency of interaction between the user and the terminal device.

A first aspect of embodiments of this application provides an interaction method. A terminal device receives a first location signal through a screen. An interface displayed on the screen includes an operation area and a display area, the first location signal is used to indicate a location of a touch point between a finger of a user and the operation area, the operation area includes a first target area, and a page displayed in the display area includes a first target function. The terminal device determines, based on the first location signal, that the location of the touch point is in the first target area. The terminal device provides a first feedback. The first feedback is used to introduce the first target function.

In this application, the terminal device receives the first location signal through the screen. The interface displayed on the screen includes the operation area and the display area, the operation area includes the first target area, and the page displayed in the display area includes the first target function. The terminal device determines, based on the first location signal, that the location of the touch point is in the first target area, and then the terminal device provides the first feedback used to introduce the first target function. The user may learn, in this manner, of a function included in the display area, thereby improving efficiency of interaction between the user and the terminal device.

In a possible implementation of the first aspect, the method further includes: The terminal device receives a first instruction through the screen. The terminal device enables the first target function based on the first instruction.

In this possible implementation, different first target functions may be enabled by using first instructions in various forms. For example, if the finger of the user is lifted from the first target area, a tapping operation of an object bound to the current first target area is performed, or the first target function bound to the first target area is performed. If the finger of the user touches and holds, a touching and holding operation of the object bound to the current first target area is performed. If the finger of the user slides towards the inside of the screen in the first target area, a cancellation operation is performed. If the finger of the user presses in the first target area, a voice label of the object or function bound to the first target area is broadcast. There may also be a plurality of other implementations. The terminal device enables the first target function based on the first instruction, so that interaction between the user and the terminal device is better implemented.

In a possible implementation of the first aspect, the first instruction includes touching and holding the first target area, double tapping the first target area, or pressing the first target area.

In this possible implementation, a plurality of implementations of the first instruction are provided, thereby improving feasibility of the solution.

In a possible implementation of the first aspect, the operation area further includes a second target area, and the method further includes: The terminal device determines, based on the first location signal, that the location of the touch point is in the second target area. The terminal device provides a second feedback. The second feedback is used to introduce a second target function, and the page displayed in the display area does not include the second target function.

In this possible implementation, the page displayed in the display area does not include the second target function. For example, the second target function may be a system function in the terminal device. As shown in FIG. 2, it is assumed that the terminal device is a mobile phone, and the second target function may be a "back" function in the mobile phone, or may be a "home screen" function in a system. This is merely used as an example for description herein. The second target function may be a function in another form. This possible implementation provides more abundant interaction manners, and further improves efficiency of interaction between the user and the terminal device.

In a possible implementation of the first aspect, the method further includes: The terminal device receives a second instruction through the screen. The terminal device enables a second target function based on the second instruction.

In this possible implementation, the terminal device enables the second target function based on the second instruction, and interaction between the user and the terminal device is better implemented.

In a possible implementation of the first aspect, the second instruction includes touching and holding a second target area, double tapping the second target area, or pressing the second target area.

In this possible implementation, a plurality of implementations of the second instruction are provided, thereby improving feasibility of the solution.

In a possible implementation of the first aspect, the first feedback includes a sound feedback or a vibration feedback.

In a possible implementation of the first aspect, the second feedback includes a sound feedback or a vibration feedback.

In a possible implementation of the first aspect, the operation area includes at least one of an upper top edge, a left side edge, a lower bottom edge, and a right side edge of the interface displayed on the screen.

In this possible implementation, the user may find the operation area more conveniently, thereby improving efficiency of interaction between the user and the terminal device, and improving user experience.

A second aspect of embodiments of this application provides a terminal device. The terminal device includes a screen, a processor, and a memory. The processor is coupled to the memory, the memory is configured to store a program or instructions of the terminal device, and the processor is configured to execute the program or the instructions of the terminal device in the memory, to enable the terminal device to perform the method according to the first aspect or any possible implementation of the first aspect.

It can be learned from the foregoing technical solutions that embodiments of this application have the following advantages.

In this application, the terminal device receives the first location signal through the screen. The interface displayed on the screen includes the operation area and the display area, the operation area includes the first target area, and the page displayed in the display area includes the first target function. The terminal device determines, based on the first location signal, that the location of the touch point is in the first target area, and then the terminal device provides the first feedback used to introduce the first target function. The user may learn, in this manner, of a function included in the display area, thereby improving efficiency of interaction between the user and the terminal device.

DESCRIPTION OF EMBODIMENTS

Figure 1:
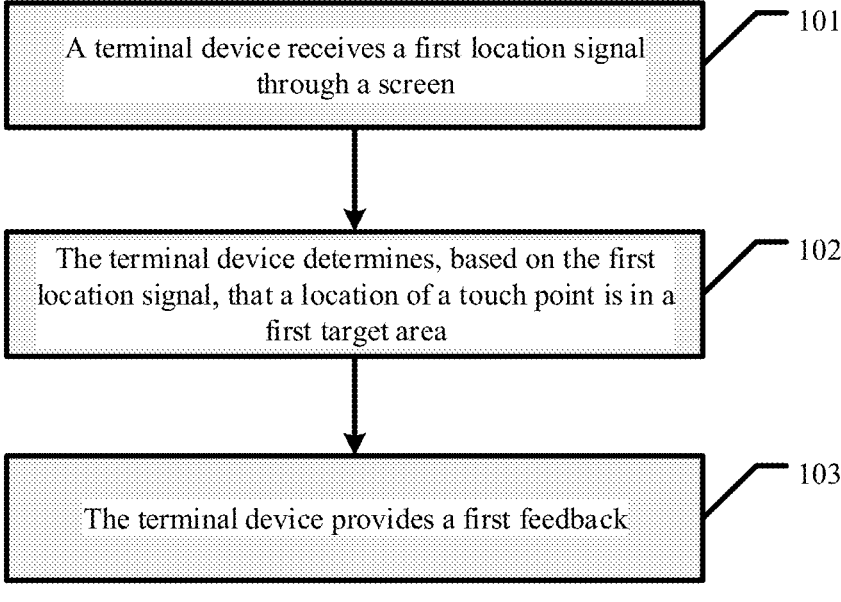
FIG. 1 is a diagram of an embodiment of an interaction method according to this application.

The following clearly and completely describes the technical solutions in embodiments of the present disclosure with reference to the accompanying drawings. It is clear that the described embodiments are merely a part rather than all of embodiments of the present disclosure. All other embodiments obtained by a person skilled in the art based on embodiments of the present disclosure shall fall within the protection scope thereof.

In the specification, claims, and accompanying drawings of the present disclosure, the terms "first", "second", "third", "fourth", and so on (if any) are intended to distinguish between similar objects but do not necessarily indicate a particular order or sequence. It should be understood that the data used in such a way is interchangeable in proper circumstances so that embodiments described herein can be implemented in other orders in addition to the order illustrated or described herein.

In embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a particular manner for ease of understanding.

The term "and/or" in this application describes only an association relationship of associated objects and represents that three relationships may exist. For example, A and/or B may represent the following three cases: Only A exists, both A and B exist, and only B exists, where A and B may be singular or plural. In addition, in the descriptions of this application, "a plurality of" means two or more than two unless otherwise specified. "At least one of the following items (pieces)" or a similar expression thereof refers to any combination of these items, including any combination of a single item (piece) or a plurality of items (pieces). For example, at least one item (piece) of a, b, or c may indicate: a, b, c, a and b, a and c, b and c, or a, b, and c, where a, b, and c may be singular or plural.

Different from a common user with sound vision, a user with visual impairment cannot see content displayed on a screen, and cannot accurately tap a location on the screen. Therefore, currently, the user with visual impairment mainly relies on a screen reading service to operate a mobile phone.

In a screen reading process, an area that is being read by a terminal device is referred to as a focus. When the user with visual impairment needs to browse content on a page, the focus can traverse all content and functions on the page displayed on the screen. When the focus moves to an interactive object, the device may read a text label of the object. For example, a page of a mobile payment website includes a plurality of functions. When the focus moves to a "payment" button on a page displayed on a screen, if the function is a function desired by the user with visual impairment, a specified operation may be performed at any location on the screen to select the button, so as to implement a function corresponding to the button. If the function is not the one that the user wants, the focus continues to be slid to move to a next button until the user with visual impairment selects a desired function or the focus traverses the entire page.

An existing website page usually has various content, and all functions on the page are traversed to select a function that the user with visual impairment wants to execute. Such an interaction manner has low efficiency.

To resolve the foregoing problem, this application provides an interaction method and a terminal device. The terminal device provided in this application receives a first location signal through a screen. An interface displayed on the screen includes an operation area and a display area, the operation area includes a first target area, and a page displayed in the display area includes a first target function. The terminal device determines, based on the first location signal, that a location of a touch point is in the first target area, and then the terminal device provides a first feedback used to introduce the first target function. The user may learn, in this manner, of a function included in the display area, thereby improving efficiency of interaction between the user and the terminal device.

FIG. 1 is a schematic diagram of an embodiment of an interaction method according to this application.

The embodiment of the interaction method provided in this application includes operation 101 to operation 103.

101: A terminal device receives a first location signal through a screen.

In this embodiment of this application, an interface displayed on the screen includes an operation area and a display area, the first location signal is used to indicate a location of a touch point between a finger of a user and the operation area, the operation area includes a first target area, and a page displayed in the display area includes a first target function.

In this embodiment of this application, if the screen integrated into the terminal device is a capacitive screen, when the finger touches a location on the screen of the terminal device, a coupling capacitor is formed between the user and a surface of the screen due to a human body electric field. For a high-frequency current, the capacitor is a direct conductor, so the finger sucks a small current from the touch point. The current flows out from each of electrodes on four corners of the touchscreen, and currents flowing through the four electrodes are in direct proportion to distances between the finger and the four corners. The terminal device may obtain the location of the touch point by accurately calculating a proportion of the four currents, to obtain the first location signal.

In this embodiment of the application, the screen integrated into the terminal device may be a capacitive screen, or the screen integrated into the terminal device may be a resistive screen. The terminal device may alternatively be integrated with another screen of a different type. When a screen of a different type is integrated into the terminal device, the terminal device may receive the first location signal in a different manner. This is not limited herein.

102: The terminal device determines, based on the first location signal, that the location of the touch point is in the first target area.

In this embodiment of this application, the interface displayed on the screen includes the operation area and the display area. The operation area includes one or more first target areas, and the page displayed in the display area includes one or more first target functions. The first target area in the operation area corresponds to the first target function on the display page. When the finger of the user touches a first target area in the operation area, it means that the user browses a first target function corresponding to the first target area, and the terminal device generates a feedback used to describe the first target function.

In this embodiment of the application, the operation area includes at least one of an upper top edge, a left side edge, a lower bottom edge, and a right side edge of the interface displayed on the screen. The operation area may also be another area on the screen. This is not limited herein.

103: The terminal device provides a first feedback.

In this embodiment of this application, the first feedback is used to introduce the first target function.

In some embodiments, the first feedback may be a sound feedback, a vibration feedback, or another feedback that may be used to introduce the first target function. This is not limited herein.

Figure 2:
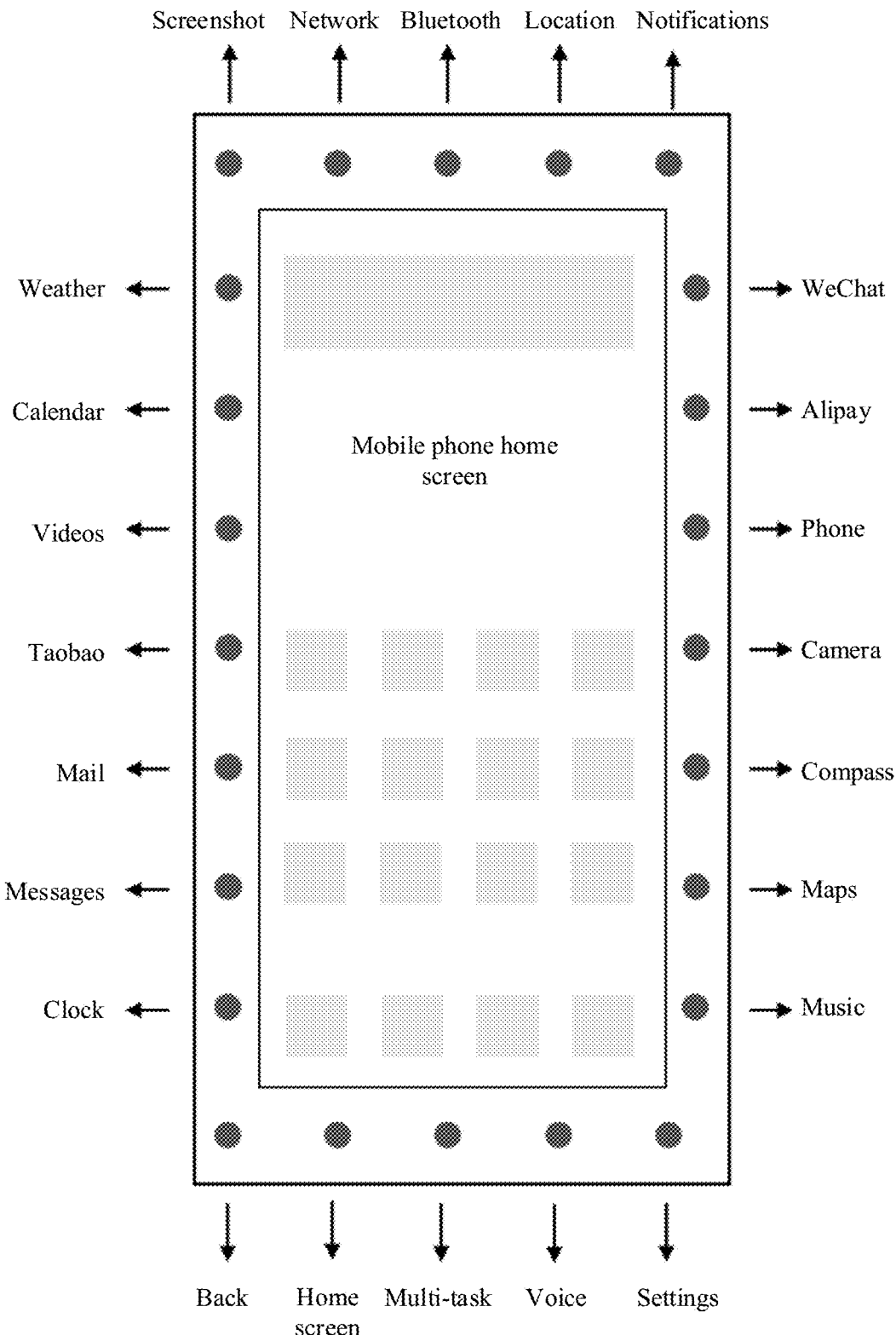
FIG. 2 is a diagram of another embodiment of an interaction method according to this application.

FIG. 2 is a schematic diagram of another embodiment of an interaction method according to this application.

Refer to FIG. 2. For example, a terminal device may have a side edge interaction mode. When the side edge interaction mode is enabled, a screen is split into a display area and an operation area. That is, an actual display area of the screen is zoomed out, and a side edge, a top edge, and a bottom edge are reserved for use by a user. The user with visual impairment may use a finger to touch an operation area of the side edge, the top edge, and the bottom edge, to interact with the terminal device. If the terminal device sets each first target area as a plurality of "dots", as shown in the figure, a first "dot" on the left side corresponds to a weather function, a second "dot" corresponds to a calendar function, and other different "dots" correspond to other different functions. When the finger touches the second "dot", the device generates a first feedback. The first feedback is used to introduce the calendar function corresponding to the second "dot". The feedback may be in a form of reading a calendar in a voice broadcast manner, or may be in another manner.

The foregoing example is merely used as an example for description. During implementation, a form of the first target area is not limited to a "dot", and there may be a plurality of other implementations. In addition, different first target functions may be introduced by using a plurality of forms of first feedbacks. This is not limited herein.

Figure 3:
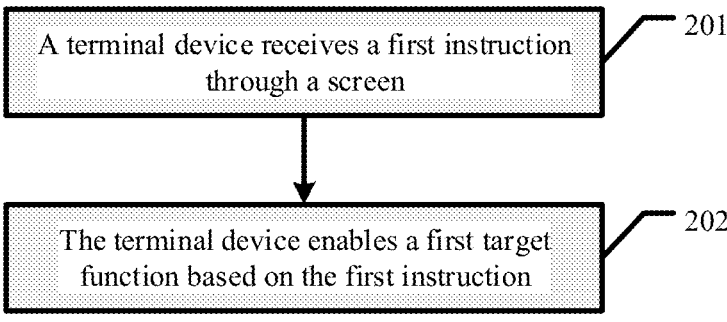
FIG. 3 is a diagram of another embodiment of an interaction method according to this application.

FIG. 3 is a schematic diagram of another embodiment of an interaction method according to this application.

Refer to FIG. 3. In this embodiment of this application, in addition to operation 101 to operation 103, operation 201 and operation 202 may be further performed in the interaction method provided in this application. An implementation is described in detail in the following embodiment.

201: A terminal device receives a first instruction through a screen.

In this embodiment of this application, the first instruction is used to enable a first target function. In some embodiments, the first instruction may be touching and holding a first target area, and the first instruction may be double tapping the first target area. In some embodiments, the first instruction may be pressing the first target area, and the first instruction may alternatively be another instruction used to enable the first target function. This is not limited herein.

202: The terminal device enables the first target function based on the first instruction.

For example, refer to FIG. 2, and when a finger touches a second "dot", the device generates a first feedback, and the first feedback is used to introduce a calendar function corresponding to the second "dot". It is assumed that in this case, the user wants to enable the calendar function, and the corresponding first instruction for enabling the function is double tapping the second "dot". In this case, the finger of a user double taps the second "dot" to enable the calendar function.

Figure 4:
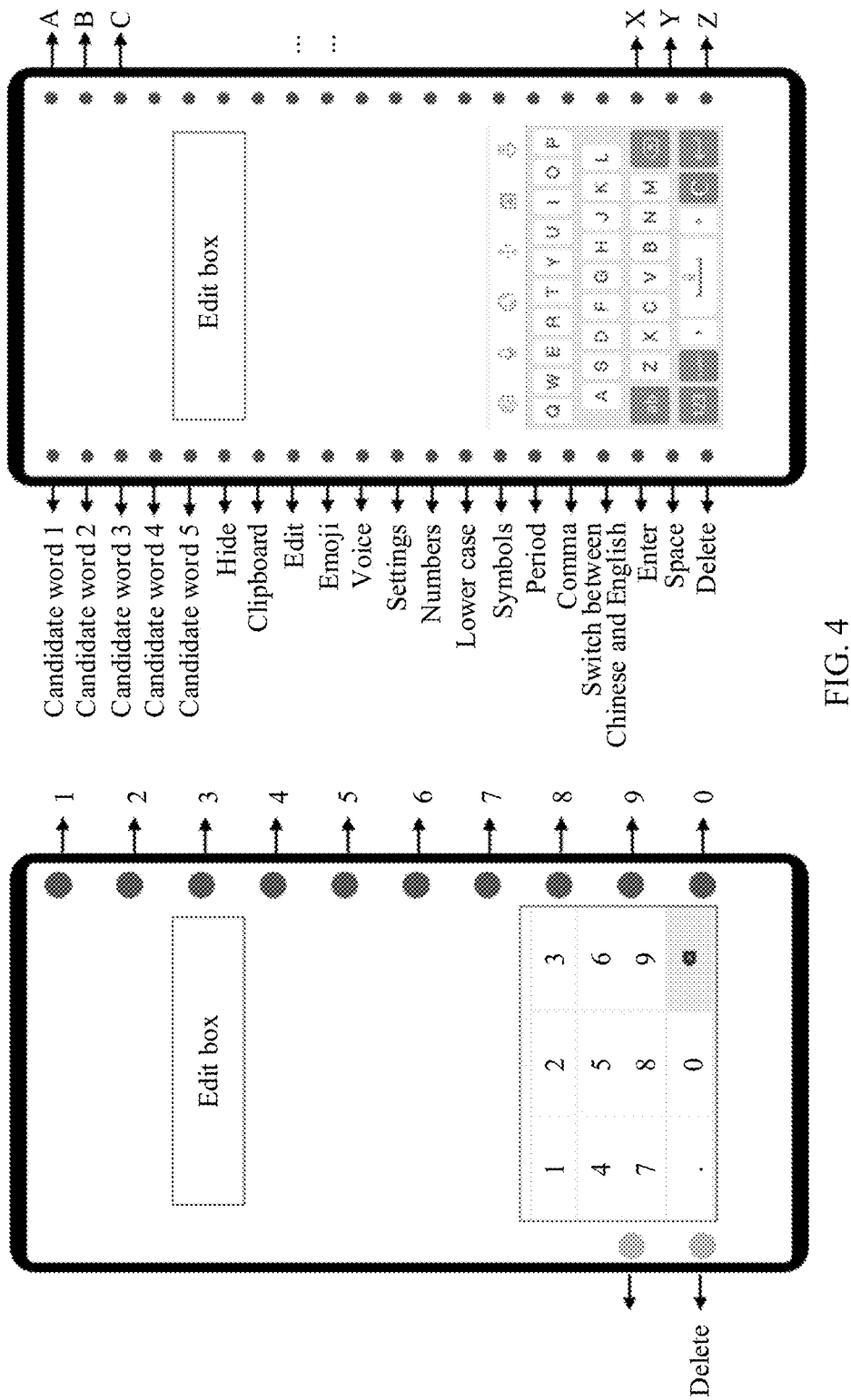
FIG. 4 is a diagram of another embodiment of an interaction method according to this application.

FIG. 4 is a schematic diagram of another embodiment of an interaction method according to this application.

For example, refer to FIG. 4. FIG. 4 shows two examples in a text input scenario. Number keys and subtitle keys may be mapped to touch points on one side, and text editing operations may be mapped to the other side, to facilitate quick input by a user by relying on a sense of touch and a location. It is assumed that a first target area is each "dot" set in an operation area, and different "dots" may be bound to different numbers, letters, or functions. A left accompanying drawing in FIG. 4 is used as an example. It is assumed that a finger of the user touches a first "dot". In this case, a terminal device broadcasts through a voice (a first feedback) a number 1 (a first target function) bound to the current dot. If the user wants to input the number 1 in an edit box, the user double taps the "dot" (a first instruction) to complete input of the number 1.

The foregoing example is merely used as an example for description. During implementation, different first target functions may be enabled by using first instructions in various forms. For example, if the finger of the user is lifted from a first target area, a tapping operation of an object bound to the current first target area is performed, or the first target function bound to the first target area is performed. If the finger of the user touches and holds, a touching and holding operation of the object bound to the current first target area is performed. If the finger of the user slides towards the inside of a screen in the first target area, a cancellation operation is performed. If the finger of the user presses in the first target area, a voice label of the object or function bound to the first target area is broadcast. There may be a plurality of other implementations, and this is not limited herein.

Figure 5:
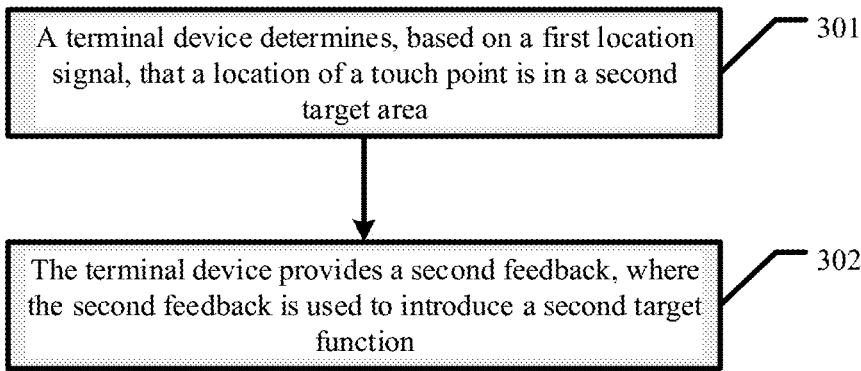
FIG. 5 is a diagram of another embodiment of an interaction method according to this application.

FIG. 5 is a schematic diagram of another embodiment of an interaction method according to this application.

Refer to FIG. 5. In this embodiment of this application, in addition to a first target area, an operation area may further include a second target area. In addition to operation 101 to operation 103, in some embodiments, operation 301 and operation 302 may be further performed in the interaction method provided in this application. An example implementation is described in detail in the following embodiment.

301: A terminal device determines, based on a first location signal, that a location of a touch point is in a second target area.

In this embodiment of this application, a manner in which the terminal device determines, based on the first location signal, that the location of the touch point is in the second target area is similar to the manner used in operation 101 to operation 103. Details are not described herein again.

In this embodiment of this application, a form of the second target area is similar to that of a first target area. Details are not described herein again.

302: The terminal device provides a second feedback, where the second feedback is used to introduce a second target function.

In this embodiment of this application, a page displayed in a display area does not include the second target function. For example, the second target function may be a system function in the terminal device. As shown in FIG. 2, it is assumed that the terminal device is a mobile phone, and the second target function may be a "back" function in the mobile phone, or may be a "home screen" function in a system. This is merely used as an example for description herein. The second target function may be a function in another form. This is not limited herein.

Refer to FIG. 5. In this embodiment of this application, in addition to operation 101 to operation 103, in some embodiments, the terminal device receives a second instruction through a screen, and then enables the second target function based on the second instruction.

In this embodiment of this application, an implementation in which the terminal device receives the second instruction through the screen, and then enables the second target function based on the second instruction is similar to an implementation in which the terminal device enables the first target function through the first instruction. Details are not described herein again.

In this embodiment of this application, a form of the second instruction is similar to the form of the first instruction provided in the embodiment shown in operation 201 and operation 202. Details are not described herein again.

In this embodiment of this application, the terminal device may bind the first target area to the first target function based on an instruction of the user.

Figure 6:
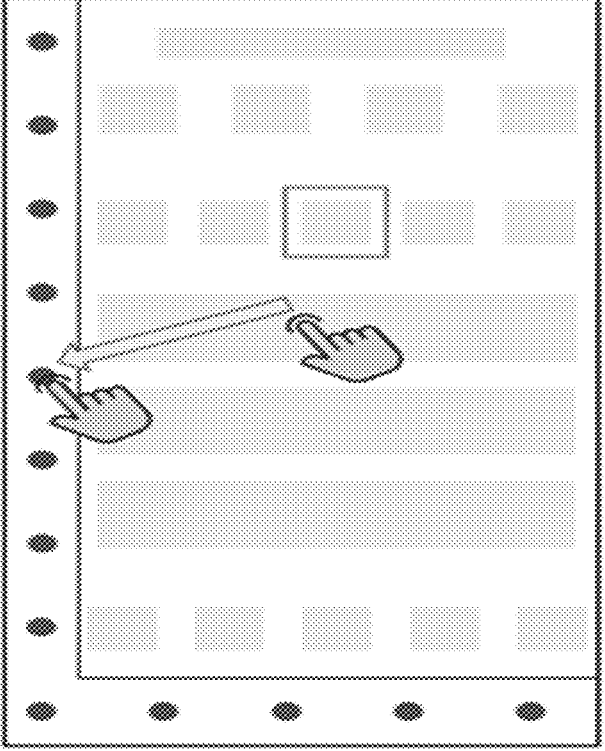
FIG. 6 is a diagram of another embodiment of an interaction method according to this application.

FIG. 6 is a schematic diagram of another embodiment of an interaction method according to this application.

Refer to FIG. 6. For example, after a user selects an update function in an operation area, a screen is split into an operation area and a display area. The operation area includes a plurality of first target areas, and in this case, the first target areas are not bound to any function. A terminal device traverses, in a voice broadcast manner, all functions displayed in the display area. It is assumed that when the terminal device broadcasts a code scanning function, a user wants to bind the code scanning function to a fifth "dot" (the first target area) in a left operation area shown in FIG. 6. In this case, when the terminal device broadcasts the code scanning function, the user touches any point in the display area, and the terminal device sends a voice indicating selection success (or triggers a vibration feedback). A finger of the user continues to move to the operation area on a side without leaving the screen, and releases the finger after moving to the fifth "dot". Then, the system binds the fifth "dot" to the code scanning function.

In this embodiment of this application, it may be understood that function binding may be implemented in another manner. This is not limited herein.

Figure 7:
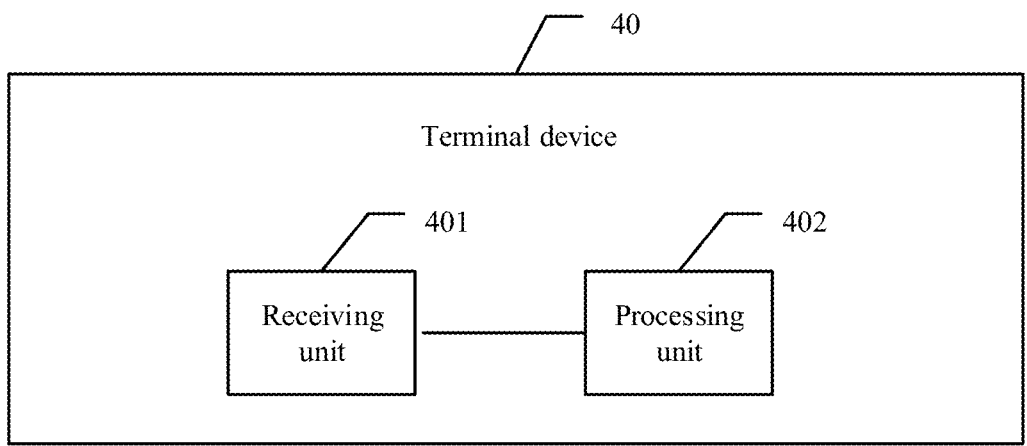
FIG. 7 is a diagram of a terminal device according to this application.

The foregoing embodiment provides different implementations of an interaction method. The following provides a terminal device 40. As shown in FIG. 7, the terminal device 40 is configured to perform the operations performed by the terminal device in the foregoing embodiment. For details about the execution operations and corresponding beneficial effects, refer to the foregoing corresponding embodiments. Details are not described herein again. The terminal device 40 includes a receiving unit 401 and a processing unit 402.

The receiving unit 401 is configured to receive a first location signal through a screen. An interface displayed on the screen includes an operation area and a display area, the first location signal is used to indicate a location of a touch point between a finger of a user and the operation area, the operation area includes a first target area, and a page displayed in the display area includes a first target function.

The processing unit 402 is configured to:

determine, based on the first location signal, that the location of the touch point is in the first target area; and provide a first feedback, where the first feedback is used to introduce the first target function.

In a possible implementation, the receiving unit 401 is further configured to receive a first instruction through the screen.

The processing unit 402 is configured to enable the first target function based on the first instruction.

In a possible implementation, the first instruction includes touching and holding the first target area, double tapping the first target area, or pressing the first target area.

In a possible implementation, the operation area further includes a second target area.

The processing unit 402 is further configured to:

determine, based on the first location signal, that the location of the touch point is in the second target area; and provide a second feedback, where the second feedback is used to introduce a second target function, and the page displayed in the display area does not include the second target function.

In a possible implementation, the receiving unit 401 is further configured to receive a second instruction through the screen.

The processing unit 402 is configured to enable the second target function based on the second instruction.

In a possible implementation, the second instruction includes touching and holding the second target area, double tapping the second target area, or pressing the second target area.

In a possible implementation, the first feedback includes a sound feedback or a vibration feedback.

In a possible implementation, the second feedback includes a sound feedback or a vibration feedback.

In a possible implementation, the operation area includes at least one of an upper top edge, a left side edge, a lower bottom edge, and a right side edge of the interface displayed on the screen.

It should be noted that, because content such as information exchange between modules of the terminal device 40 and an execution process is based on a same concept as the method embodiment of this application, technical effects brought are the same as those of the method embodiments of the present disclosure. For particular content, refer to the descriptions in the foregoing method embodiments of this application. Details are not described herein again.

Figure 8:
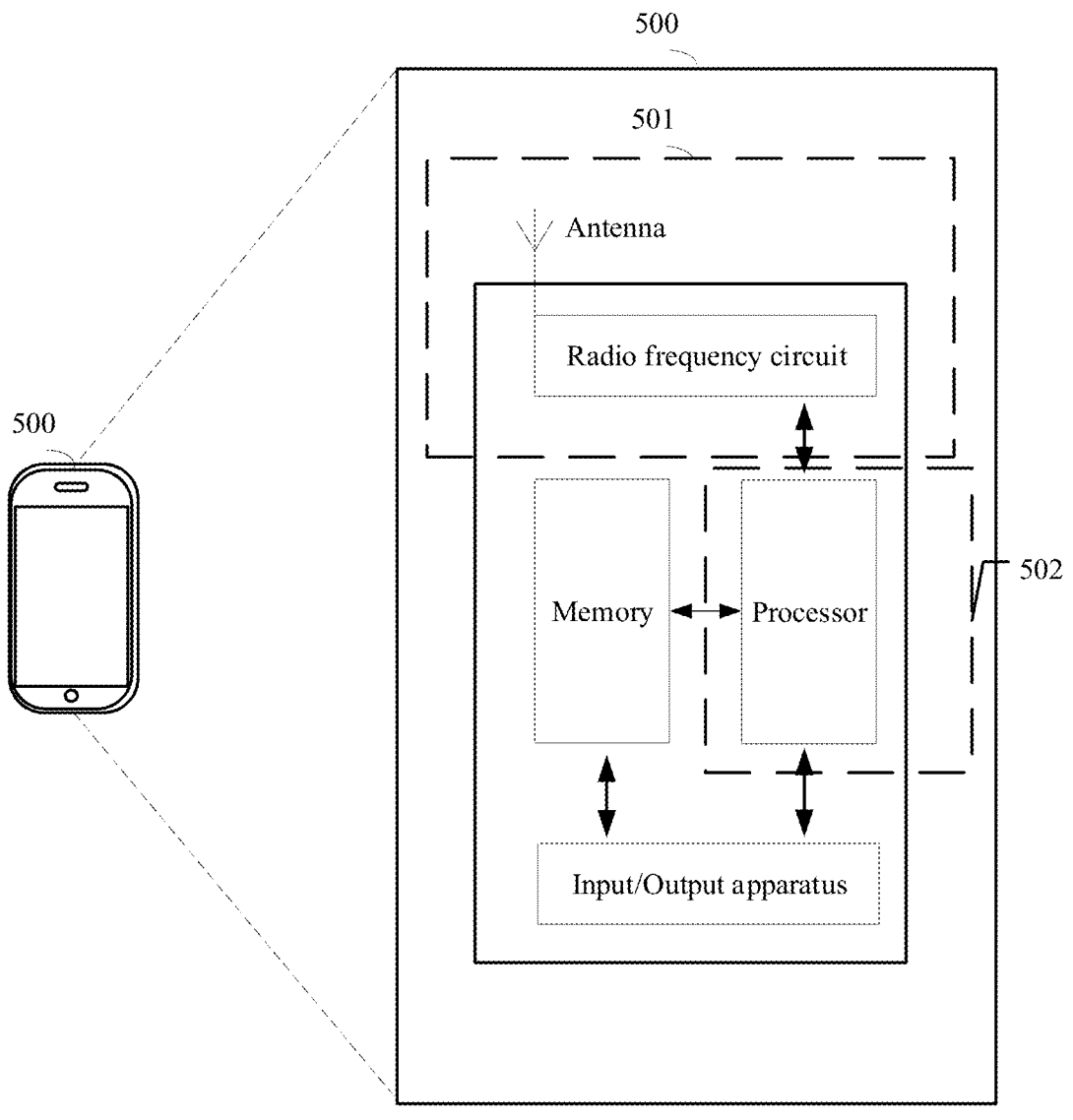
FIG. 8 is a diagram of a communication apparatus according to this application.

An embodiment of this application further provides a communication apparatus 500. The communication apparatus 500 may be a terminal device or a chip. The communication apparatus 500 may be configured to perform an operation performed by the terminal device in the foregoing method embodiments. When the communication apparatus 500 is a terminal device, FIG. 8 is a simplified schematic diagram of a structure of the terminal device. For ease of understanding and convenience of figure illustration, FIG. 8 shows an example in which the terminal device is a mobile phone. As shown in FIG. 8, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in an electromagnetic wave form. The input/output apparatus, such as a touchscreen, a display, or a keyboard, is mainly configured to receive data input by a user and output data to the user. It should be noted that some types of terminal devices may have no input/output apparatus.

When needing to send data, after performing baseband processing on to-be-sent data, the processor outputs a baseband signal to the radio frequency circuit. After performing radio frequency processing on the baseband signal, the radio frequency circuit sends the radio frequency signal to the outside in an electromagnetic wave form through the antenna. When data is sent to the terminal device, the radio frequency circuit receives the radio frequency signal through the antenna, converts the radio frequency signal into the baseband signal, and outputs the baseband signal to the processor. The processor converts the baseband signal into data, and processes the data. For ease of description, FIG. 8 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, an antenna that has a transceiver function and a radio frequency circuit may be considered as a transceiver unit of the terminal device, and a processor that has a processing function may be considered as a processing unit of the terminal device.

The terminal device includes a transceiver unit 501 and a processing unit 502. The transceiver unit 501 may also be referred to as a transceiver, a transceiver machine, a transceiver apparatus, or the like. The processing unit 502 may also be referred to as a processor, a processing single board, a processing module, a processing apparatus, or the like.

In some embodiments, a component that is in the transceiver unit 501 and that is configured to implement a receiving function may be considered as a receiving unit, and a component that is in the transceiver unit 501 and that is configured to implement a sending function may be considered as a sending unit. In other words, the transceiver unit 501 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmit circuit, or the like.

For example, in an implementation, the transceiver unit 501 is configured to perform a receiving operation of the terminal device. The processing unit 502 is configured to perform a processing action on a terminal device side.

It should be understood that FIG. 8 is merely an example, not a limitation. The terminal device including the transceiver unit and the processing unit may not depend on the structure shown in FIG. 8.

When the communication apparatus 500 is a chip, the chip includes a transceiver unit and a processing unit. The transceiver unit may be an input/output circuit or a communication interface, and the processing unit may be a processor, a microprocessor, or an integrated circuit that is integrated on the chip. The input circuit may be an input pin. The output circuit may be an output pin. The processing circuit may be a transistor, a gate circuit, a trigger, any logic circuit, or the like. An input signal received by the input circuit may be received and input by, for example, but not limited to, a receiver. A signal output by the output circuit may be output to, for example, but not limited to, a transmitter and transmitted by the transmitter. In addition, the input circuit and the output circuit may be different circuits, or may be a same circuit. In this case, the circuit is used as the input circuit and the output circuit at different moments.

It should be noted that because content such as information exchange between the modules of the device 500 and an execution process provided in the foregoing embodiment is based on a same concept as the method embodiment of this application, technical effects brought are the same as those of the method embodiments of the present disclosure. For particular content, refer to the descriptions in the foregoing method embodiments of this application. Details are not described herein again.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or may not be performed. In addition, the displayed or discussed mutual couplings or direct couplings or communication connections may be indirect couplings or communication connections through some interfaces, apparatuses or units, and may be implemented in electrical, mechanical, or other forms.

The unit described as a separate part may or may not be physically separate, and a part displayed as a unit may or may not be a physical unit, that is, may be located in one position, or may be distributed on a plurality of network elements. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. An interaction method comprising:
receiving, by a terminal device, a first location signal through a screen, wherein an interface displayed on the screen comprises an operation area and a display area, the first location signal is used to indicate a location of a touch point between a finger of a user and the operation area, the operation area comprises a first target area, and a page displayed in the display area comprises a first target function;
determining, by the terminal device, an instruction of the user when the terminal device broadcasts the first target function in a voice broadcast manner, the instruction of the user representing a user contact within the first target area;
binding the first target area to the first target function based on the instruction of the user;
determining, by the terminal device and based on the first location signal, that the location of the touch point is in the first target area; and
providing, by the terminal device, a first feedback, wherein the first feedback is used to introduce the first target function, wherein the first target area is bound to the first target function by the terminal device based on the instruction of the user by:
traversing, by the terminal device in the voice broadcast manner, all functions displayed in the display area;
indicating, by the terminal device, a selection success by a voice indication or a vibration feedback in response to touching, by the finger of the user, any point in the display area when the terminal device broadcasts a respective target function that a user wants to bind to a respective first tarte area of a plurality of first target areas in the operation area that are not bound to any target function; and
binding the respective target function to the respective first target area in response to releasing the finger after moving it to the respective first target area without leaving the screen.

2. The interaction method according to claim 1, wherein the method further comprises:
receiving, by the terminal device, a first instruction through the screen; and
enabling, by the terminal device, the first target function based on the first instruction.

3. The interaction method according to claim 2, wherein the first instruction comprises touching and holding the first target area, double tapping the first target area, or pressing the first target area.

4. The interaction method according to claim 1, wherein the operation area further comprises a second target area, and the method further comprises:
determining, by the terminal device based on the first location signal, that the location of the touch point is in the second target area; and
providing, by the terminal device, a second feedback, wherein the second feedback is used to introduce a second target function, and the page displayed in the display area does not comprise the second target function.

5. The interaction method according to claim 1, wherein the method further comprises:
receiving, by the terminal device, a second instruction through the screen; and
enabling, by the terminal device, a second target function based on the second instruction.

6. The interaction method according to claim 5, wherein the second instruction comprises touching and holding a second target area, double tapping the second target area, or pressing the second target area.

7. The interaction method according to claim 1, wherein the first feedback comprises a sound feedback or a vibration feedback.

8. The interaction method according to claim 4, wherein the second feedback comprises a sound feedback or a vibration feedback.

9. The interaction method according to claim 1, wherein the operation area comprises at least one of an upper top edge, a left side edge, a lower bottom edge, or a right side edge of the interface displayed on the screen.

10. A terminal device comprising:

a screen;

a processor; and a memory;

wherein the processor is coupled to the memory, the memory is configured to store a program or instructions, and the processor is configured to execute the program or the instructions in the memory, which, upon execution of the program or the instructions causes the terminal device to:

receive a first location signal through the screen, wherein an interface displayed on the screen comprises an operation area and a display area, the first location signal is used to indicate a location of a touch point between a finger of a user and the operation area, the operation area comprises a first target area, and a page displayed in the display area comprises a first target function;

determine an instruction of the user when the terminal device broadcasts the first target function in a voice broadcast manner, the instruction of the user representing a user contact within the first target area;

bind the first target area to the first target function based on the instruction of the user;

determine, based on the first location signal, that the location of the touch point is in the first target area; and provide a first feedback, wherein the first feedback is used to introduce the first target function, wherein the first target area is bound to the first target function by the terminal device based on the instruction of the user by:

traversing, in the voice broadcast manner, all functions displayed in the display area;

indicating a selection success by a voice indication or a vibration feedback in response to touching, by the finger of the user, any point in the display area when the terminal device broadcasts a respective target function that a user wants to bind to a respective first tarte area of a plurality of first target areas in the operation area that are not bound to any target function; and binding the respective target function to the respective first target area in response to releasing the finger after moving it to the respective first target area without leaving the screen.

11. The terminal device according to claim 10, wherein the terminal device is further caused to:

receive a first instruction through the screen; and enable the first target function based on the first instruction.

12. The terminal device according to claim 11, wherein the first instruction comprises touching and holding the first target area, double tapping the first target area, or pressing the first target area.

13. The terminal device according to claim 10, wherein the operation area further comprises a second target area, and the terminal device is further caused to:

determine, based on the first location signal, that the location of the touch point is in the second target area; and provide a second feedback, wherein the second feedback is used to introduce a second target function, and the page displayed in the display area does not comprise the second target function.

14. The terminal device according to claim 10, wherein the terminal device is further caused to:

receive a second instruction through the screen; and enable a second target function based on the second instruction.

15. The terminal device according to claim 14, wherein the second instruction comprises touching and holding a second target area, double tapping the second target area, or pressing the second target area.

16. The terminal device according to claim 10, wherein the first feedback comprises a sound feedback or a vibration feedback.

17. The terminal device according to claim 13, wherein the second feedback comprises a sound feedback or a vibration feedback.

18. The terminal device according to claim 10, wherein the operation area comprises at least one of an upper top edge, a left side edge, a lower bottom edge, or a right side edge of the interface displayed on the screen.

19. A non-transitory machine-readable medium having instructions stored therein, which when executed by a processor of a terminal device, cause the terminal device to perform a method, the method comprising:

receiving a first location signal through a screen, wherein an interface displayed on the screen comprises an operation area and a display area, the first location signal is used to indicate a location of a touch point between a finger of a user and the operation area, the operation area comprises a first target area, and a page displayed in the display area comprises a first target function;

determining an instruction of the user when the terminal device broadcasts the first target function in a voice broadcast manner, the instruction of the user representing a user contact within the first target area;

binding the first target area to the first target function based on the instruction of the user;

determining, based on the first location signal, that the location of the touch point is in the first target area; and providing a first feedback, wherein the first feedback is used to introduce the first target function, wherein the first target area is bound to the first target function by the terminal device based on the instruction of the user by:

traversing, in the voice broadcast manner, all functions displayed in the display area;

indicating a selection success by a voice indication or a vibration feedback in response to touching, by the finger of the user, any point in the display area when the terminal device broadcasts a respective target function that a user wants to bind to a respective first tarte area of a plurality of first target areas in the operation area that are not bound to any target function; and binding the respective target function to the respective first target area in response to releasing the finger after moving it to the respective first target area without leaving the screen.

20. The non-transitory machine-readable medium according to claim 19, wherein the method further comprises:

receiving a first instruction through the screen; and enabling the first target function based on the first instruction.

* * * * *